United States Patent [19]

Yamamoto

[11] 4,456,661

[45] Jun. 26, 1984

[54] MAGNETIC RECORDING MEDIUM

[75] Inventor: Nobuyuki Yamamoto, Shizuoka, Japan

[73] Assignee: Fuji Photo Film Co., Ltd., Kanagawa, Japan

[21] Appl. No.: 289,857

[22] Filed: Aug. 4, 1981

[30] Foreign Application Priority Data

Aug. 15, 1980 [JP] Japan ................................ 55-112415

[51] Int. Cl.³ .............................................. G11B 5/72
[52] U.S. Cl. .................... 428/607; 360/134;
360/135; 360/136; 427/128; 427/131; 427/132;
428/336; 428/694; 428/900; 428/622; 428/928;
428/629
[58] Field of Search ....................... 427/128, 131, 132;
428/694, 692, 695, 900, 607, 622, 629, 928, 336;
360/134–136

[56] References Cited

U.S. PATENT DOCUMENTS

| | | |
|---|---|---|
| 4,087,582 | 5/1978 | Shirahata et al. .................... 427/132 |
| 4,277,540 | 7/1981 | Aine ..................................... 428/900 |
| 4,305,993 | 12/1981 | Zaitzu et al. ......................... 428/328 |
| 4,332,863 | 6/1982 | Hosaku ................................ 428/900 |

FOREIGN PATENT DOCUMENTS

| | | | |
|---|---|---|---|
| 2648303 | 5/1977 | Fed. Rep. of Germany ...... | 427/131 |
| 54-123920 | 9/1979 | Japan ................................... | 427/132 |
| 54-141107 | 11/1979 | Japan ................................... | 427/132 |
| 55-1651 | 1/1980 | Japan ................................... | 428/695 |

OTHER PUBLICATIONS

European Document No. 0036469, 9/1981, IBM Corp.

*Primary Examiner*—Ellis P. Robinson
*Attorney, Agent, or Firm*—Sughrue, Mion, Zinn, Macpeak and Seas

[57] ABSTRACT

A magnetic recording medium having a thin magnetic metal layer on a base is disclosed. A thin metal film of Group IA, IB, IIA, IIB, IIIB, IVA, IVB, VA, VB, VIA, VIB or VIIB of the Periodic Table is formed on the thin magnetic metal layer or the base on the reverse side of which the thin magnetic metal layer is formed. A layer of aliphatic acid is further formed on said thin metal film.

7 Claims, No Drawings

MAGNETIC RECORDING MEDIUM

FIELD OF THE INVENTION

This invention relates to a magnetic recording medium using a thin magnetic film as a magnetic recording layer, and more particularly, to a magnetic recording medium of thin metal film type having good running properties and abrasion resistance.

BACKGROUND OF THE INVENTION

Most conventional magnetic recording media are the coated type prepared by forming a coating of powdered magnetic material on a non-magnetic base and drying the same. Examples of the powdered magnetic material are magnetic oxide particles or ferromagnetic alloy particles such as $\gamma\text{-}Fe_2O_3$, Co-doped $\gamma\text{-}Fe_2O_3$, $Fe_3O_4$, Co-doped $Fe_3O_4$, a berthollide compound of $\gamma\text{-}Fe_2O_3$ and $Fe_3O_4$, and $CrO_2$. These particles are dispersed in an organic binder such as a vinyl chloride-vinyl acetate copolymer, styrene-butadiene copolymer, epoxy resin or polyurethane resin. With the recent increasing demand for higher density recording, there has been increased interest in a magnetic recording medium of "thin metal film type" that eliminates a binder and uses, as a magnetic recording layer, a thin ferromagnetic film. The thin ferromagnetic film is formed by vapor deposition techniques such as vacuum deposition, sputtering and ion plating or plating techniques such as electroplating or electrolessplating. Various efforts are being made to use such recording medium on a commercial scale.

In most coated type conventional magnetic recording media, the magnetic material is made of a metal oxide having a small saturation magnetization. Accordingly, the coating must be above a certain minimum thickness required for high density recording, below which a drop in signal output occurs. In addition, the manufacturing process is complicated and requires large separate facilities for solvent recovery or pollution control. The great advantage of the magnetic recording medium of thin metal film type is that it can be prepared without using non-magnetic substances such as a binder in the formation of a magnetic layer and, as a result, the magnetic recording medium of thin metal film type allows markedly higher density recording than does the magnetic recording medium of coated type. However, this type of magnetic recording medium has a significant problem arising from corrosion, impact and friction resistance. During recording, reproduction and erasure of magnetic signals, the medium is placed in relative movement with the magnetic head and it wears or breaks due to contact with the head. Due to the absence of a binder, scratches are formed in the magnetic recording medium of thin metal type as it moves in slidable contact with the magnetic head. Accordingly, the magnetic recording is easily scraped off the medium. An attempt to solve the problem has been made by forming an overcoat about 0.2 μm thick made of a polymer film. However, due to spacing loss, this causes decreased output during high-density recording.

It is known that the formation of scratches can be prevented by applying a thin coating of lubricant on the tape surface. The libricant reduces friction between the magnetic head and thin metal film and makes the film scratchproof. However, the effect of the lubricant does not last long and as the magnetic tape is used repeatedly, the friction between the head and thin metal film increases suddenly or the film breaks. An alternative method for reducing friction involves forming a lubricant protective layer of metal or metal oxide on the surface of magnetic tape. This method is described in Japanese Patent Application (OPI) Nos. 39708/78 and 40505/78 (the symbol OPI as used herein means an unexamined published Japanese patent application). But again, the effect of the lubricant protective layer does not last long, and as the magnetic tape is used, the friction increases suddenly or the magnetic film breaks.

In general, the thin magnetic metal film is formed on a very smooth base to achieve high-density recording. However, such smooth base is still entirely unsatisfactory for producing good running properties, particularly in a humid atmosphere. The base is also unsatisfactory for obtaining high abrasion resistance if it is prepared by the above-described methods used for increasing the lubricity of the magnetic layer.

SUMMARY OF THE INVENTION

Therefore, one object of this invention is to provide a magnetic recording medium of thin metal film type having good running properties and high abrasion resistance.

Another object of this invention is to provide a magnetic recording medium of thin metal film type wherein the improved running properties and abrasion resistance last for an extended period of time.

As a result of various studies on the magnetic recording medium of thin metal film type, we have found that these objects can be achieved by forming a thin film of metal of Group IA, IB, IIA, IIB, IIIB, IVA, IVB, VA, VB, VIA, VIB or VIIB on a magnetic thin metal film or a base on the reverse side, and by further forming a layer of aliphatic acid on said thin metal film.

DETAILED DESCRIPTION OF THE INVENTION

According to this invention, a thin magnetic metal film can be formed on a base by vapor deposition or plating. Vapor deposition is particularly preferred because it forms the desired film rapidly, is a relatively simple process and requires no treatment of the effluent or other additional steps. In the vapor deposition method, a substance or compound thereof in the form of vapor or ionized vapor is condensed on a substrate in a gaseous atmosphere or vacuum. This method includes vacuum deposition, sputtering, ion plating and chemical vapor deposition. The conditions for the respective techniques of vapor deposition vary greatly according to the substance to be condensed by the particular technique. General process conditions for the respective techniques are listed in Table 1 below.

TABLE 1

| | Technique | | | | |
|---|---|---|---|---|---|
| Conditions | Vacuum Deposition | Sputtering | Ion Plating | Ion Beam Deposition | Chemical Vapor Deposition |
| Pressure of Atmosphere (Torr) | $\lesssim 10^{-5}$ | $10^{-2} \sim 10^{-3}$ (Ar) | $10^{-2} \sim 10^{-3}$ (Ar) | $10^{-5} \sim 10^{-6}$ | $<1$ atm (Ar) |
| Material Temperature | vaporization temperature | water cooled | vaporization temperature | — | >vaporization temperature |
| Film Thickness | ~a few microns | ~several tens of microns | ~several tens of microns | ~a few microns | ~several hundreds of microns |
| Condensing Rate Å/Sec | ~several hundreds | ~several hundreds | ~several hundreds | several tens ~3,000 | $10^2$ |
| Voltage Applied | — | a few volts to several hundreds of volts | several tens of volts to ten kilovolts (glow discharge) | 500 V | — |

The ferromagnetic metal layer serving as the magnetic recording layer of the medium of this invention is a thin film made by vapor deposition or plating of a ferromagnetic metal such as iron, cobalt, nickel, etc., or a ferromagnetic alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re or Co-Sm-Cu. The film thickness is in the range of from 0.05 to 2 μm, preferably from 0.1 to 0.4 μm when it is used in magnetic recording medium.

Examples of the metal to be formed on at least the thin magnetic metal film or the base on the opposite side include those of Groups IA, IB, IIA, IIB, IIIB, IVA, IVB, VA, VB, VIA, VIB and VIIB of the Periodic Table. Particularly preferred metals are those of Groups IA, IB, IIA, IIB and IVA, and Mg, Ca, Sr, Ba, Cu, Zn, Cd, Sn and Pb that react chemically with aliphatic acids. These metals are formed on at least the thin magnetic metal film or the base by either the vapor deposition or plating process described above. There are some metals which do not form a thin film by vapor deposition without nucleation of Cd, Zn or the like or surface treatment such as glow discharge treatment. To form a thin film of these metals, the vapor deposition is preceded by the necessary nucleation or surface treatment.

The thickness of the thin film of these metals is generally about 5 to about 2,000 Å, preferably 10 to 500 Å. Further, the thin film of metals can be formed by co-vapor deposition of two or more different metals.

A coating of aliphatic acid is formed on the thin metal film, and any aliphatic acid may be used without particular limitation. Saturated or unsaturated aliphatic acids having 8 to 26 carbon atoms such as lauric acid, myristic acid, behenic acid, stearic acid or oleic acid are preferred.

The magnetic recording medium of this invention may also contain other lubricants such as metal soap; aliphatic amides; mineral oils; animal and vegetable oils such as whale oil; silicone oil; fine electrically conductive powder such as graphite; fine inorganic powder such as molybdenum disulfide or tungsten disulfide; fine plastic powder such as polyethylene, polypropylene, polyethylene-vinyl chloride copolymer or polytetrafluoroethylene; α-olefin polymers; unsaturated aliphatic hydrocarbons which are liquid at ordinary temperatures (compounds having about 20 carbon atoms wherein an n-olefin double bond is positioned at terminal(s)); fluorocarbons; and mixtures thereof. A coating of these lubricants is formed on the thin metal film by vapor deposition. Alternatively, it may be formed by applying a solution of the lubricants in an organic solvent onto the thin metal film and drying the coating. The lubricant is generally present on the thin metal film in an amount of from 2 to 200 mg/m$^2$, preferably from 5 to 100 mg/m$^2$. Examples of the organic solvent used to prepare a coating solution of the lubricant include ketones such as acetone, methyl ethyl ketone, methyl isobutyl ketone, and cyclohexanone; alcohols having 1 to 10 carbon atoms such as methanol, ethanol, propanol and butanol; esters such as methyl acetate, ethyl acetate, butyl acetate, ethyl lactate, glycol acetate monoethyl ether; glycol ethers such as ether, glycol dimethyl ether, glycol monoethyl ether and dioxane; hydrocarbons such as pentane, hexane, heptane, octane, nonane and decane; tars (aromatic hydrocarbons) such as benzene, toluene and xylene; and chlorinated hydrocarbons such as methylene chloride, ethylene chloride, carbon tetrachloride, chloroform, ethylene chlorohydrin and dichlorobenzene.

In addition to the lubricant, a corrosion inhibitor or a mold inhibitor which is well known in the art may be used as desired.

The thin metal film is preferably in direct contact with the layer of aliphatic acid. However, the two layers may be separated by an intermediate layer. The intermediate layer is preferably as thin as possible.

The magnetic recording medium of this invention achieves the following advantages:

(1) The running property after repeated use which is expressed as a (change in dynamic friction coefficient and hereunder referred to as repeated running property) and abrasion resistance are improved remarkably;

(2) The running tension is very small even in a humid atmosphere; and (3) The running tension in a record/reproduce apparatus as typified by dynamic friction coefficient is very small even if the thin magnetic metal film or base has a very smooth surface.

All of these advantages were not found in the magnetic recording medium having a thin film of a metal other than those defined herein, i.e., metals of Groups VIII, IIIA and VIIA formed on the thin magnetic metal layer or base and further having an aliphatic acid on the thin metal film.

This invention is now described in greater detail by reference to the following examples and comparative examples which are given here for illustrative purposes only and are by no means intended to limit the scope of the invention.

EXAMPLE 1

A magnetic tape was prepared by forming a magnetic cobalt layer (0.2 μm thick) on a polyethylene terephthalate film 20 μm thick in the following manner: An electron beam vaporization source was charged with cobalt having a purity of 99.95% to perform slant vapor deposition at an angle of incidence of 70° at $5 \times 10^{-5}$ Torr. A coating of silver nuclei was formed in a thickness of 50 Å on the thin magnetic metal layer and base, and thereafter, a zinc coating was vapor-deposited on the silver coating to give a thickness of 300 Å. The resulting recording medium was referred to as Sample No. 10. Lauric acid ($C_{11}H_{23}COOH$) was dissolved in n-hexane to form a 0.5 wt% solution which was applied to the zinc coating and dried to form Sample No. 11.

EXAMPLE 2

A magnetic tape was prepared by vapor-depositing a 0.3 μm coating of Co-Ni alloy (30 wt% Ni) on a polyamide film 12 μm thick. A copper coating 500 Å thick was formed on the thin magnetic metal film by vapor deposition to give Sample No. 20. A lubricant comprising a 1:1 (wt%) mixture of behenic acid ($C_{21}H_{43}COOH$) and behenic acid amide ($C_{21}H_{43}CONH_2$) was vapor-deposited so that 50 mg of the lubricant was present per square meter of the surface of the copper coating. The resulting product was referred to as Sample No. 21.

EXAMPLE 3

A magnetic tape was prepared by vapor-depositing a 0.25 μm coating of Fe-V alloy (5 wt% V) on a polyethylene terephthalate film 12 μm thick. A lead coating 200 Å thick was formed on the thin magnetic metal film by vapor deposition to give Sample No. 30. A mixture of stearic acid and oleic acid (weight ratio=4:1) was dissolved in methyl ethyl ketone to form a 0.5 wt% solution which was applied to Sample No. 30 in a coating weight of 100 mg/m² and dried to form Sample No. 31.

COMPARATIVE EXAMPLE 1

Sample No. 41 was prepared by repeating the procedure of Example 1 except that none of the Ag layer, Zn layer and lubricant layer was formed.

COMPARATIVE EXAMPLE 2

Sample No. 42 was prepared by forming a coating of lauric acid on the thin magnetic metal layer of Sample No. 41 in a coating amount of 50 mg/m² as in Example 1.

COMPARATIVE EXAMPLE 3

Sample No. 43 was prepared by vapor-depositing a 500 Å layer of aluminum (Group IIIA) on the thin magnetic metal film of Sample No. 41.

COMPARATIVE EXAMPLE 4

Sample No. 44 was prepared by forming a coating of lauric acid on Sample No. 43 in an amount of 50 mg/m² as in Example 1 and Comparative Example 2.

The durability and dynamic friction coefficient (as representative of the indices of running property) of the tape samples of Examples 1 to 3 and Comparative Examples 1 to 4 were determined by the following methods:

(1) Durability

Durability of a magnetic thin film was determined when pressing a magnetic tape against a magnetic head at a tension of 90 g/½ inch and reciprocating at 38 cm/sec 500 times. The number of abrasions that were formed on the tape surface was counted visually.

(2) Dynamic Friction Coefficient

The change in dynamic friction coefficient (μ) that occurred as a result of one, twenty, a hundred and five hundred reciprocations of the tape sample in a VHS video tape recorder (Macroad 88 of NV-8800 model Matsushita Electric Industrial Co., Ltd.) was calculated from the formula $T_2/T_1 = e^{\mu\pi}$ (wherein $T_1$ was the tape tension on the feed side of the rotary cylinder and $T_2$ was the tape tension on the takeup side). For example, assuming that $T_1$ is 50 g and $T_2$ is 150 g, "μ" is calculated as follows:

$$\frac{T_2}{T_1} = e^{\mu\pi}, \text{ i.e., } \mu = \frac{1}{\pi} \ln \frac{T_2}{T_1} = \frac{1}{\pi} \ln \frac{150}{50} = 0.35$$

The results are set forth in Table 2 below.

To determine the change in dynamic friction coefficient of a base, two additional tape samples were prepared and referred to as Sample No. 12 (having the base of the tape samples prepared in Example 1) and Sample No. 50 (having the base of the tape sample of Comparative Example 1). The results are also shown in Table 2.

TABLE 2

| Sample No. | Durability after 500 Passes* | Change in Dynamic Friction Coefficient (μ) | | | |
|---|---|---|---|---|---|
| | | Virgin | 20 Passes | 100 Passes | 500 Passes |
| 10 | more than 10 shallow abrasions | 0.33 | 0.42 | 0.54 | 0.60 |
| 11 | no abrasion observed | 0.30 | 0.30 | 0.32 | 0.35 |
| 20 | more than 10 shallow abrasions | 0.35 | 0.34 | 0.45 | 0.59 |
| 21 | no abrasion observed | 0.28 | 0.29 | 0.30 | 0.32 |
| 30 | more than 10 shallow abrasions | 0.33 | 0.32 | 0.44 | 0.48 |
| 31 | no abrasion observed | 0.30 | 0.28 | 0.30 | 0.31 |
| 41 | more than 10 deep abrasions | 0.48 | 0.55 | 0.58 | 0.67 |
| 42 | more than 10 shallow abrasions | 0.32 | 0.40 | 0.58 | 0.58 |
| 43 | 4 or 5 deep abrasions | 0.48 | 0.49 | 0.59 | 0.60 |
| 44 | more than 10 shallow abrasions | 0.32 | 0.40 | 0.57 | 0.57 |
| 12 | | 0.32 | 0.30 | 0.32 | 0.35 |
| 50 | | 0.35 | 0.40 | 0.57 | 0.59 |

*The durability was expressed in terms of the number of abrasions which appear over the whole width of the tape at an optional portion of the tape.

The data in Table 2 show that the magnetic recording medium of thin metal film type according to this invention has significantly improved running property and abrasion resistance. Furthermore, the improved properties last for an extended period of time. It is therefore clear that the recording medium has high practical value.

While the invention has been described in detail and with reference to specific embodiments thereof, it will be apparent to one skilled in the art that various changes and modifications can be made therein without departing from the spirit and scope thereof.

What is claimed is:

1. A magnetic recording tape, comprising:
   base;
   a thin magnetic metal layer on said base;
   a thin metal film on said layer, said thin metal film comprised of a metal selected from the group consisting of Mg, Ca, Sr, Ba, Cu, Zn, Cd, Sn and Pb; and
   a layer of aliphatic acid formed on said thin metal film, wherein said thin metal film chemically reacts with said aliphatic acid layer.

2. A magnetic recording tape as claimed in claim 1, wherein said thin metal film has a thickness of about 5 to about 2,000 Å.

3. A magnetic recording tape as claimed in claim 2, wherein said thin metal film has a thickness of 10 to 500 Å.

4. A magnetic recording tape as claimed in claim 1, wherein said aliphatic acid is a saturated or unsaturated aliphatic acid having 8 to 26 carbon atoms.

5. A magnetic recording tape as claimed in claim 1 wherein said thin metal film is formed by co-vapor deposition of two or more different types of said metals.

6. A magnetic recording tape as claimed in claim 1, wherein said thin magnetic metal layer has a thickness in the range of from 0.05 to 2 μm.

7. A magnetic recording tape as claimed in claim 1, wherein said thin magnetic metal layer has a thickness of from 0.1 to 0.4 μm.

* * * * *